UNITED STATES PATENT OFFICE.

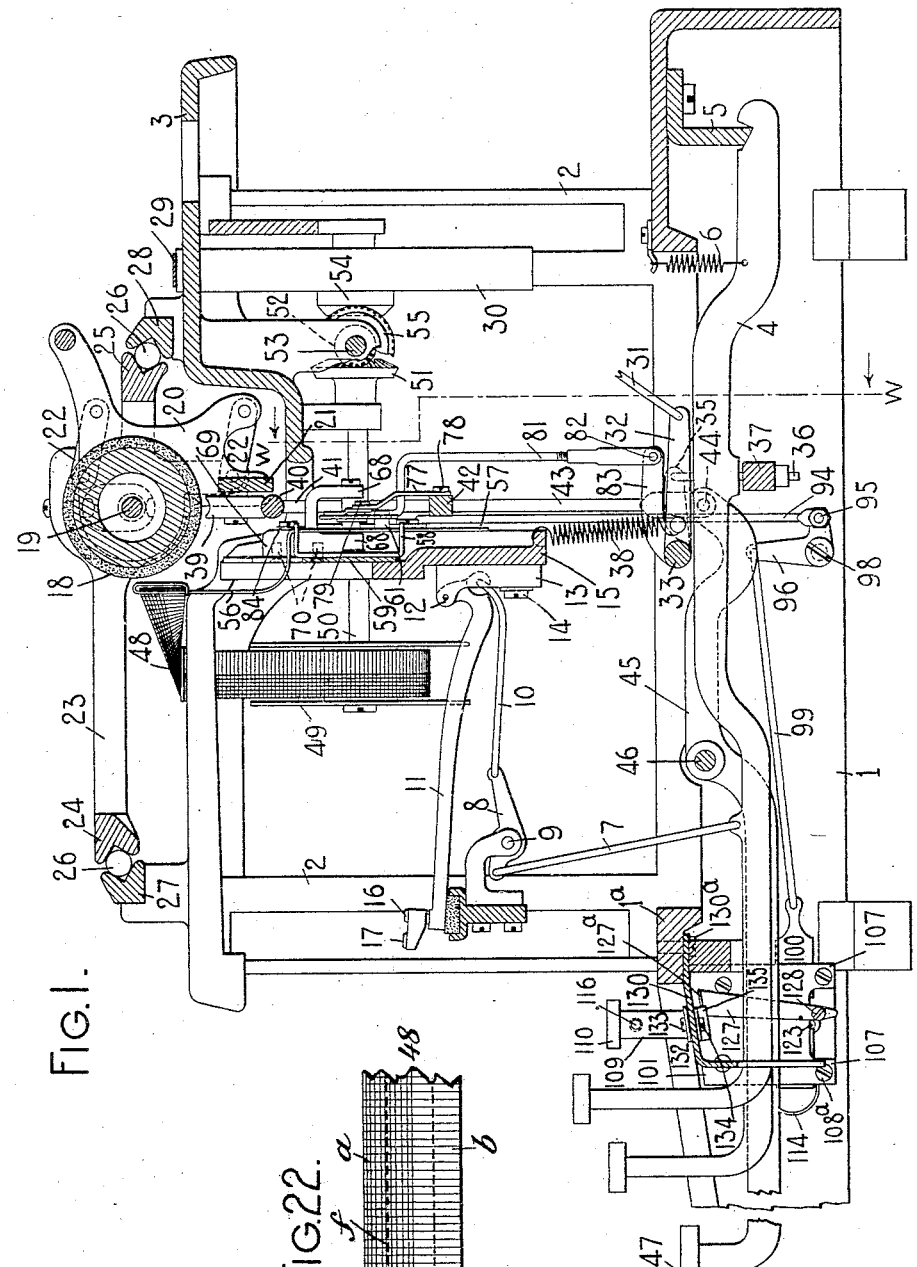

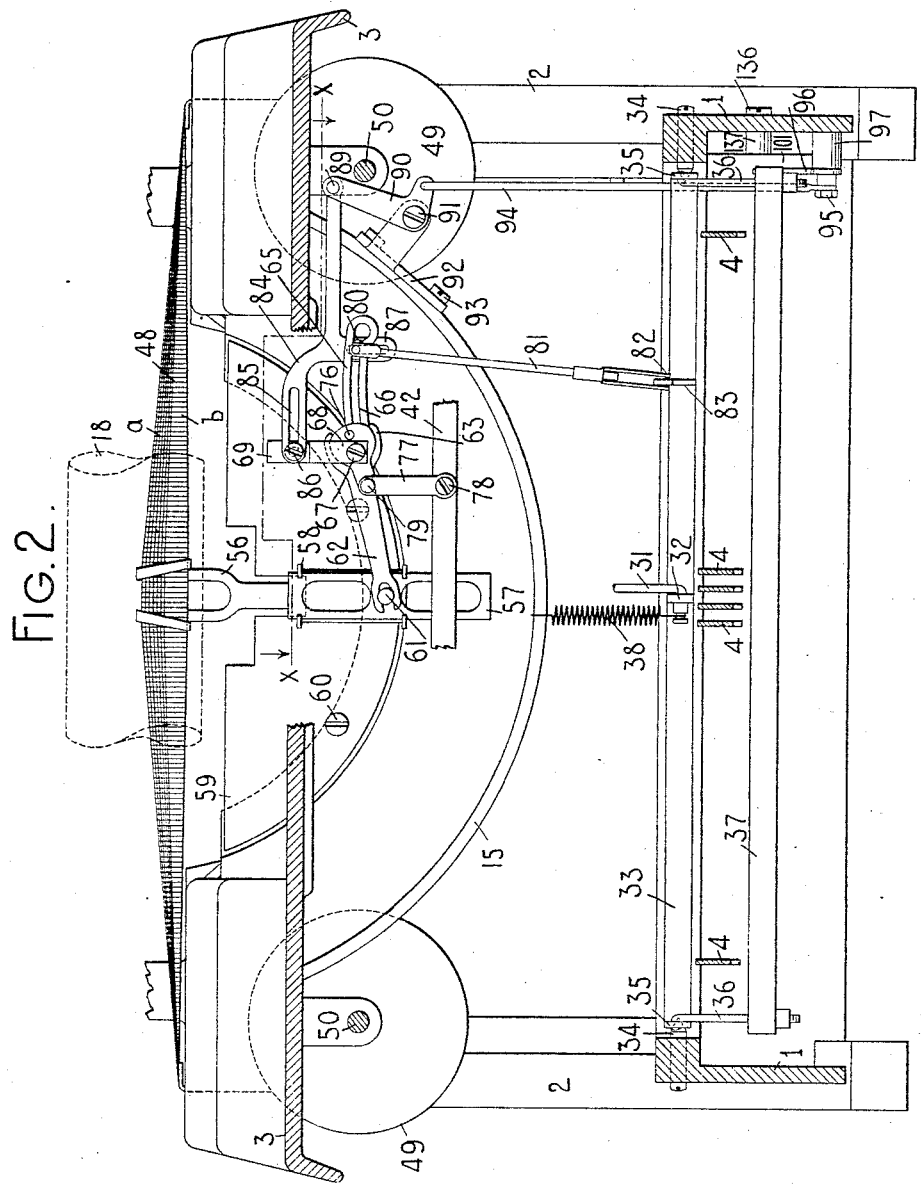

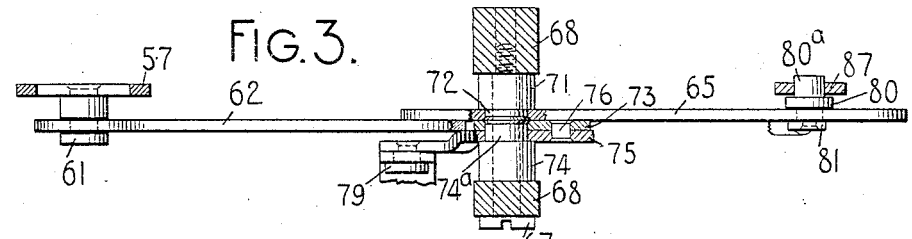
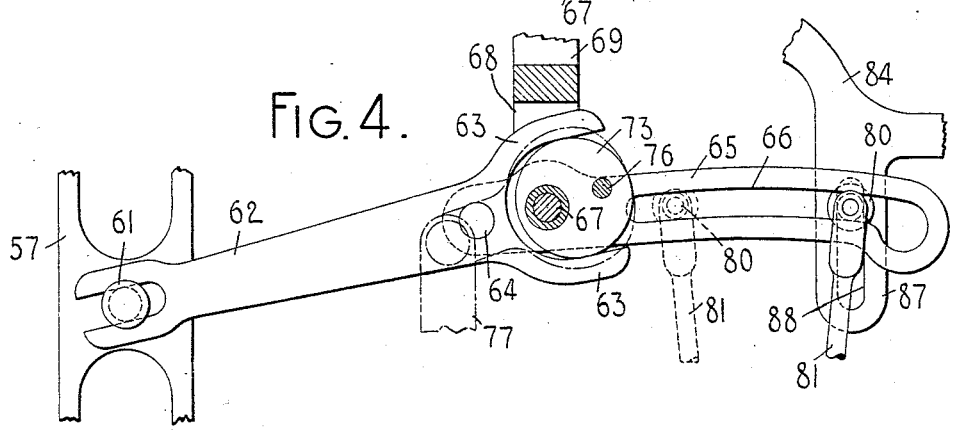
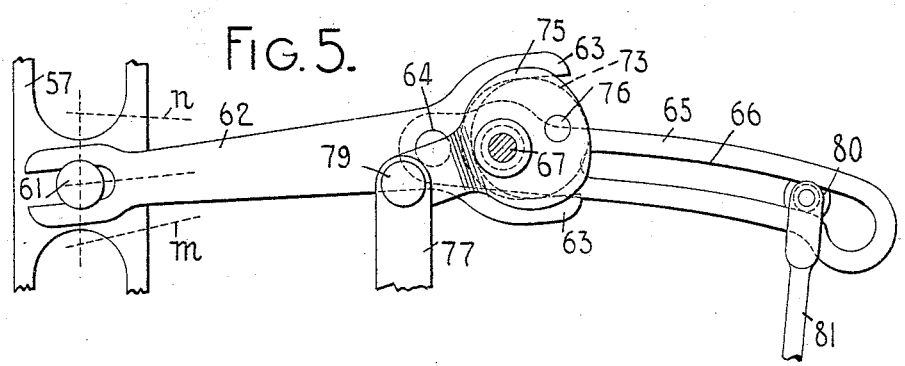
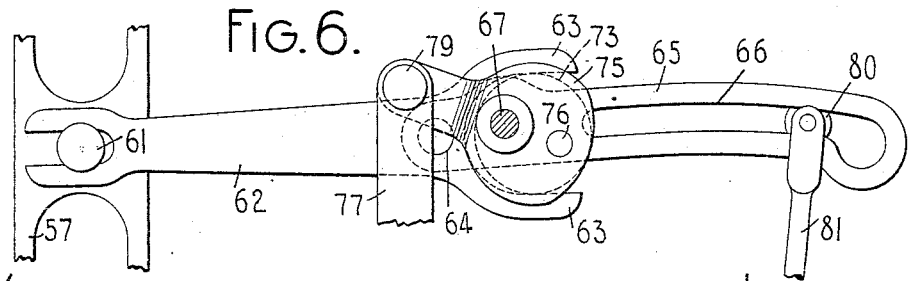

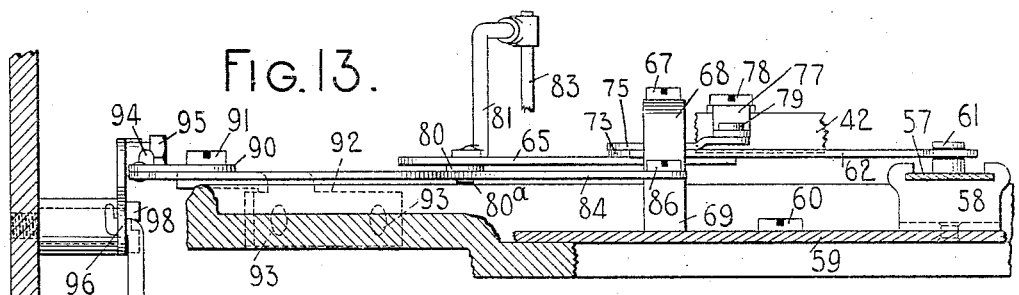
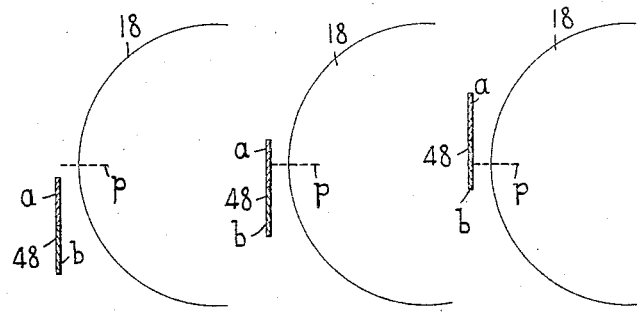
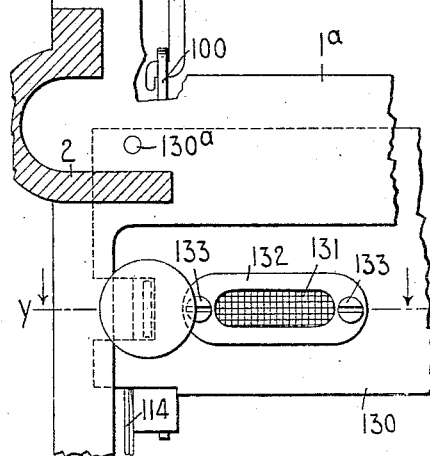
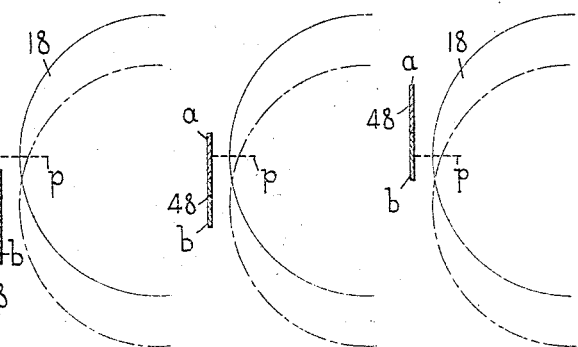

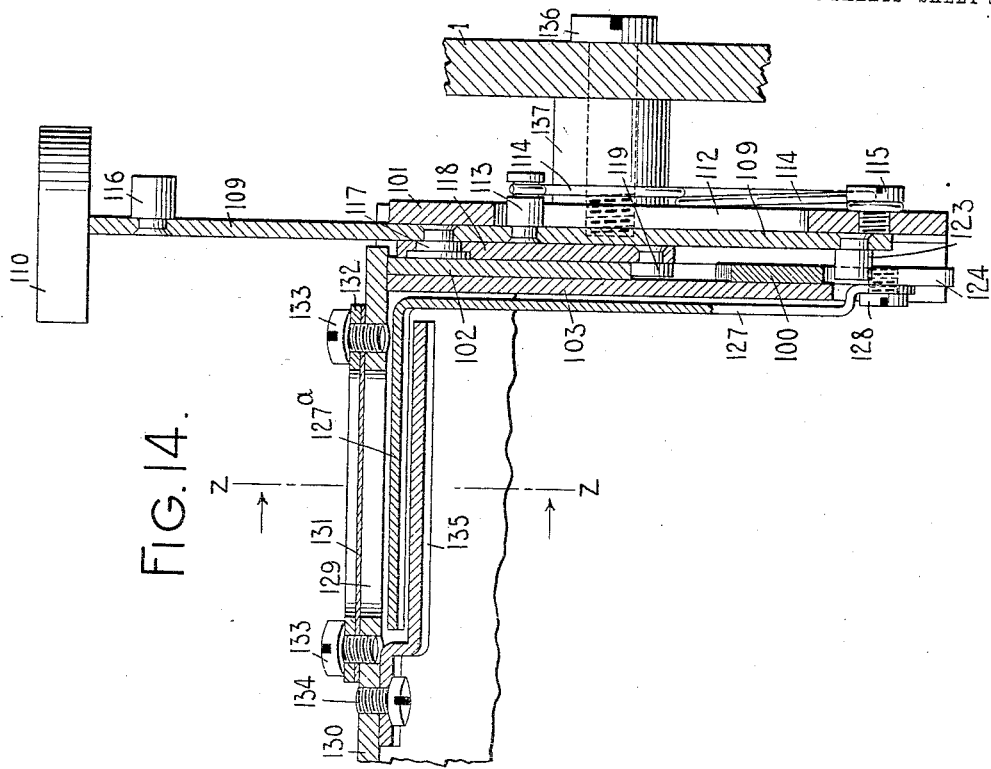
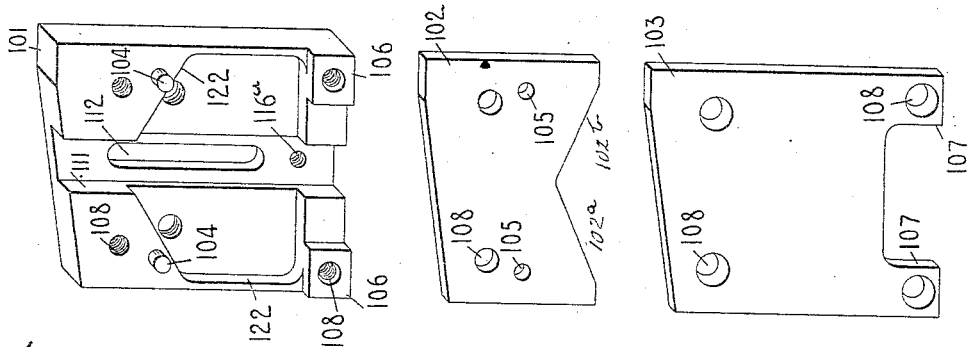

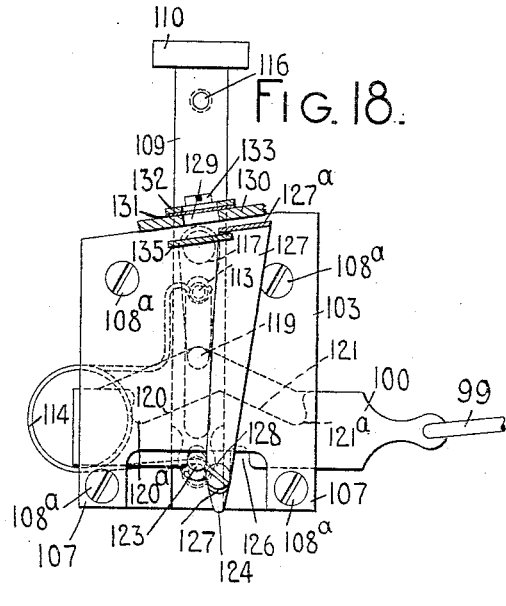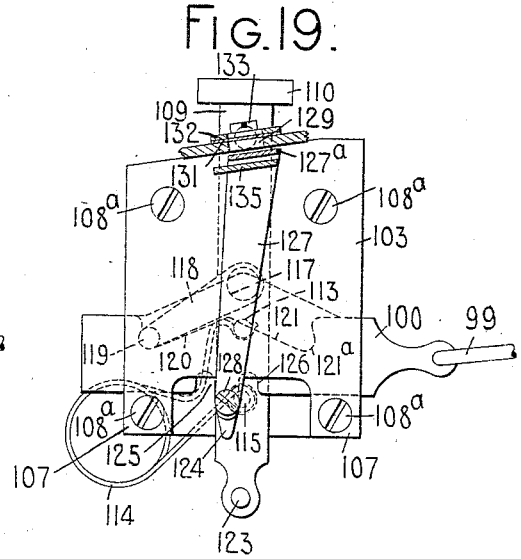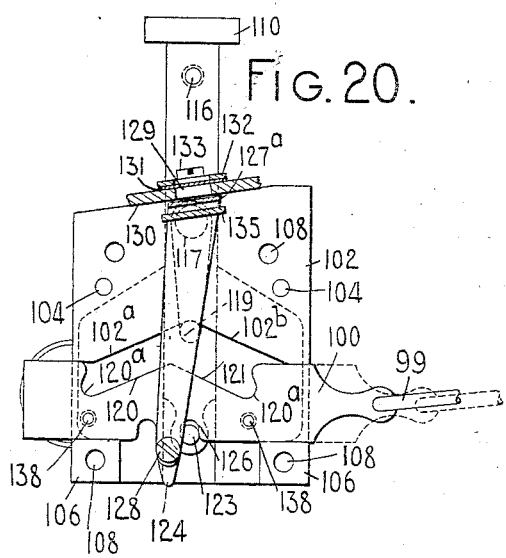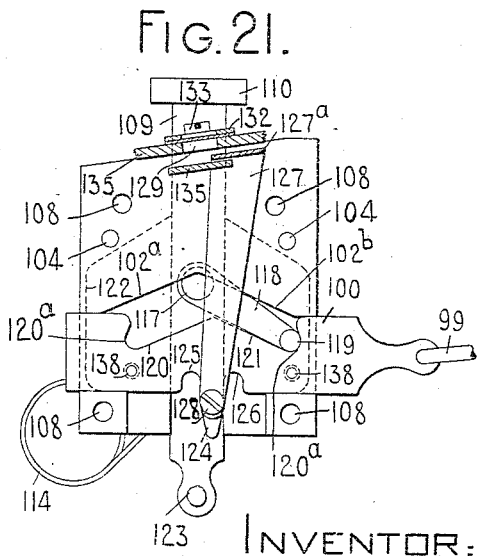

CLIO B. YAW, OF ARLINGTON, NEW JERSEY, ASSIGNOR TO REMINGTON TYPEWRITER COMPANY, OF ILION, NEW YORK, A CORPORATION OF NEW YORK.

TYPE-WRITING MACHINE.

934,124.  Specification of Letters Patent. Patented Sept. 14, 1909.

Application filed June 10, 1908. Serial No. 437,702.

*To all whom it may concern:*

Be it known that I, CLIO B. YAW, citizen of the United States, and resident of Arlington, in the county of Hudson and State of New Jersey, have invented certain new and useful Improvements in Type-Writing Machines, of which the following is a specification.

My invention relates especially to ribbon mechanisms for typewriting machines and its object, generally stated, is to provide improved devices of the class specified.

To the above and other ends the invention consists in the features of construction, combinations of devices and arrangements of parts hereinafter described and particularly pointed out in the claims.

The invention is shown as applied to a front-strike typewriting machine of the shifting platen style, but the nature of said invention is such that it may be adapted to other kinds of writing machines.

In the accompanying drawings, which illustrate one form of the invention, Figure 1 is a vertical front to rear sectional view of a typewriting machine embodying my invention, said view being taken about centrally of the machine, parts of which are omitted and parts broken away. Fig. 2 is a rear vertical sectional view taken on a plane represented by the line $w$—$w$ of Fig. 1 and looking in the direction of the arrows at said line, parts being omitted and parts broken away. Fig. 3 is a top view partly in section showing the operating lever of the vibratory ribbon carrier and associate parts. Fig. 4 is a side elevation partly in section of the parts shown in Fig. 3. Figs. 5 and 6 are side views corresponding to Fig. 4 but showing the parts in different relations from those in which they appear in Fig. 4. Figs. 7, 8 and 9 are diagrammatic views illustrating various relations between the printing portion of the ribbon and the platen when said platen is in lower case position. Figs. 10, 11 and 12 are diagrammatic views illustrating various relations between the printing portion of the ribbon and the platen when said platen is shifted for upper case position. Fig. 13 is a fragmentary horizontal sectional view taken on a plane represented by the line $x$—$x$ in Fig. 2 and looking in the direction of the arrows at said line. Fig. 14 is a rear vertical sectional view taken on a plane represented by the dotted line $y$—$y$ in Fig. 13 and looking in the direction of the arrows at said line, the movable parts, however, being shown in different relations in Fig. 14 from those in which they appear in Fig. 13. Figs. 15, 16 and 17 are perspective views of parts composing the frame of a novel key-operated ribbon-field changing mechanism. Figs. 18 to 21 inclusive are vertical sectional side views taken on a plane corresponding to the dotted line $z$—$z$ in Fig. 14 and looking in the direction of the arrows at said line, the relations among the movable parts shown in Figs. 18 to 21 differing in said figures and the relations of said movable part shown in Fig. 20 corresponding to those shown in Fig. 14. In Figs. 20 and 21 a part hereinafter termed a cover plate and shown in Figs. 18 and 19, is omitted. Fig. 22 is a face view of a portion of a ribbon illustrating the paths followed by the type impressions.

Referring first to Figs. 1 and 2, the main frame of the machine is shown as comprising a base 1, corner posts 2 and a top plate 3. Key levers 4 are fulcrumed at 5, each key lever being provided with a restoring spring 6 and being connected by suitable actuating devices (comprising a link 7, a lever 8 having a fixed pivot 9, and a link 10) with a type 11 pivoted at 12 to a hanger 13. The hangers are each secured by a screw 14 to a vertically disposed segmental support 15, said support in the present instance being stationary and suitably fixed to the frame of the machine. The type bars are each provided with a lower case type 16 and an upper case type 17, and when actuated are adapted to coöperate with the front face of a platen 18, the axle 19 whereof is journaled in the side bars 20 of a platen frame or carrier which further comprises a cross bar 21 connecting said side bars. Links 22 connect the platen frame with the platen carriage, said carriage comprising end bars 23, a front bar 24 and a rear bar 25. The bars 24 and 25 are grooved to coöperate with anti-friction balls 26, said balls also coöperating with grooved front and rear fixed guide ways numbered respectively 27 and 28. The carriage is connected by a strap 29 with a spring drum 30 which constantly urges the carriage leftward across the top plate. The leftward movement of the carriage is controlled by the usual or suitable letter feeding or escapement devices (not shown) which are connected by a link 31 with an arm 32 fixed centrally to a rock shaft 33 and extending rearward therefrom. The rock shaft, which is pivoted at its ends on screw pivots 34 supported in the sides of the base 1, is provided near its ends with rearwardly extending arms 35 supporting the depending arms or links 36, said arms 36 carrying a universal bar 37 which underlies the key levers 4 and is adapted to operate the escapement devices when any one of said key levers or the spacing levers (not shown) are operated. A spring 38 tends to maintain the universal bar and connected parts in normal position.

During the to-and-fro movements of the carriage, platen frame and platen across the top plate, a roller 39 on the platen frame coöperates with a guide rail 40 to maintain the platen frame and platen in predetermined relationship with the carriage. This relationship will not be varied except when the platen and platen frame are shifted up and down in the carriage to change case by means operative on the guide rail 40 through a shiftable frame carrying said rail. Said shiftable frame comprises side rods 41 at the top of which the rail 40 is fixed. The lower ends of the rods 41 are attached to a cross bar 42 carried by supporting rods 43 which are pivotally connected at 44 with shift levers 45, one at each side of the machine, said levers being mounted on a rock shaft 46 and each being provided with a key 47. Only one of each of the pair of rods 41 and 43 is shown in the drawings, but it will be understood that the shift frame in which these parts are comprised provides a support for the rail 40 and is shiftable by a key 47 at each side of the keyboard. Said shiftable frame is more fully illustrated in my pending application Serial No. 416,080, filed February 15, 1908, but was not invented by me and is not claimed herein *per se*.

A ribbon 48 is secured to and wound upon ribbon spools 49, said ribbon spools being vertically disposed beneath the top plate, one at each side of the machine and forward of the platen (Figs. 1 and 2). Each ribbon spool is secured to the forward end of a horizontal shaft 50 journaled in lugs depending from the top plate. As more fully illustrated in my pending said application each shaft 50 carries at its rear end a beveled pinion 51 which is adapted to coöperate with a beveled driving pinion 52 secured to a driving or power shaft 53, the latter being connected with and adapted to receive motion from the spring drum 30 through a train of devices comprising beveled pinions 54 and 55 which are always in mesh with each other. The pinion 55 is slidably connected with the driving shaft 53 but always turns therewith, so that without disengaging the pinions 54 and 55, the shaft 53 may be moved endwise to connect one or the other of the driving pinions 52 with its associate pinion 51, thereby causing the associate ribbon spools to be turned to wind the ribbon thereon. Any other suitable means may be employed to connect the shaft 53 with the pin 55 to cause said pinions to turn said shaft while at the same time permitting independent endwise movement of said shaft.

Midway between the ribbon spools the ribbon 49 is threaded through slots in a vibratory ribbon carrier or vibrator 56. Said ribbon carrier is vertically disposed and at its lower end curves toward the rear and terminates in a stem 57 extending vertically downward behind the segment 15 and guided and supported on a bracket 58 secured to the rear of a segmental cover plate 59, said plate being fastened to the support 15 by screws 60.

In my companion application, Serial No. 435,926, filed June 1st, 1908, I have shown actuating means for the ribbon carrier comprising a two-part operating lever, the parts whereof are shiftable to compensate for the shifting of the platen. In the present application I have also shown a two-part operating lever but one which is of a different construction from that shown in said companion application and which is controlled by different means.

Referring to the present construction, as best shown in Fig. 3 a rearwardly extending, grooved stud 61 is secured to the rear face of the stem or carrier-part 57 and is engaged by the slotted inner or right-hand end of one part 62 of the operating lever. The lever-part 62 extends toward the left-hand side of the machine as will be understood from a consideration of Fig. 2 which is a rear view, and said lever part at its outer end is bifurcated or forked, the forks or arms of the bifurcation being designated as 63. At 64, near the junction of the forks 63, the part 62 is pivoted to the short inner or right-hand arm of the other part 65 of the operating lever, said other part being in itself a lever and the longer or left-hand arm thereof being provided with a longitudinally extending slot 66. The lever-part 65 is fulcrumed on a screw 67, which is supported on the depending arms 68 of a forked bracket 69 secured by screws 70 to the rear face of the plate 59 (Fig. 1). To provide a bearing surface of sufficient extent for the operating lever, the lever-part 65 is provided with a hub 71 which, as shown in Fig. 3, has a reduced or shouldered end portion 72, the latter being received in a beveled hole in the lever-part 65 and its end being spread or up-set so as to securely fasten the hub 71 and the lever-part together. The hub surrounds the fulcrum screw 67 and is adapted to abut against the forward bracket-arm 68.

The means for controlling the relationship between the lever-parts 62 and 65 includes an eccentric device, the construction of which is clearly shown in Figs. 3, 4 and 5. The eccentric device comprises an eccentric proper or eccentric disk 73 which is received between the forks 63 of the lever-part 62 and is adapted to coöperate therewith. The eccentric disk is secured by a hub or connecting sleeve 74 to an adjusting device or lever 75. That arm of the lever 75 against which the disk 73 lies, is in the form of a plate-like enlargement and its other arm tapers off and is somewhat in the nature of a handle for the plate. The edges of the plate-like part overlie the contiguous faces of the forks 63 and said plate-like part entirely covers the disk 73. The handle-like part is provided with a rearward bend so that it is separated from the lever-part 62. The hub 74 surrounds and bears on the fulcrum screw 67 and is adapted to abut at one end against the rear bracket-arm 68. At its other end said hub is reduced as indicated at 74ª and enters holes formed in the disk 73 and the adjuster 75. The end of the reduced end portion 74ª is spread or up-set, thereby clamping the hub 74, disk 73 and lever 75 tightly together and causing them to turn as a single piece on the fulcrum screw 67. To further insure against relative movement between the lever 75 and the disk 73 they may be connected by a rivet 76. The eccentric disk 73 may be turned on its pivot to operate on the forks 63 and thus alter the relationship between the lever-parts 62 and 65, and in the present instance this adjustment of the disk is controlled by an arm or member 77 which is secured at its lower end by a screw 78 to the cross bar 42 and thence extends upward and is bent forward, its upper end being pivotally connected at 79 to the inner or right-hand arm of the adjuster or lever 75.

It will be understood that when the platen is shifted by the raising and lowering of the shift frame, the arm or member 77, which is fixed on the bar 42 of said frame, will operate through the adjuster 75 to turn the eccentric disk 73 on the pivot 67. Said disk acting on the forks 63 as on an eccentric strap will lower or raise the arm of the lever-part 62 on which said eccentric strap is formed, thereby turning the lever-part 62 on its pivot 64 and raising or lowering the ribbon carrier an amount proportionate to the extent of the shift movement of the platen. Consequently the ribbon carrier will move automatically with the platen when the latter is shifted and the normal relation between the printing point on the platen and the printing portion of the ribbon, or that portion of the ribbon between the slots in the ribbon carrier, will be the same in both of the shift positions of the platen. This will be apparent from a comparison of Figs. 7 and 10.

Fig. 7 shows the normal relation between the platen 18 and the printing portion of the ribbon 48 when the platen is in lower case position, the printing point on said platen being indicated by the dotted line $p$. In Fig. 10 the full lines show the position of the platen when it is shifted for upper-case printing. By comparing the printing point $p$ in Fig. 10 with the printing portion of the ribbon 48 therein shown, it will be apparent that they bear the same normal relation as in Fig. 7.

The change in the relationship due to the platen shift between the lever-parts 62 and 65 is caused by the part 62 swinging on the fulcrum 64 under the action of the disk 73. During this operation the fulcrum 64 and the lever-part 65 which carries it will remain quiescent. The lever-part 65 is moved only to cause a vibratory movement of the ribbon carrier toward and away from the printing point when the printing keys are operated. The means for moving the lever-part 65 to vibrate the ribbon carrier comprises an actuating stud 80, said stud coöperating with the slot 66 and being fast to the upper end of an actuating link 81. As shown in Figs. 1 and 2, the actuating link 81 extends downward from the stud and is provided with a rearward bend so that its lower end may be pivotally connected at 82 with an arm 83 fast on and extending rearward from the rock-shaft 33. It will be understood that the link 81 connects the lever-part 65 with the universal bar 37 so that when the universal bar is depressed by one of the key levers 4, the link 81 will be drawn downward and the lever-part 65 will turn on its fulcrum 67. This turning of the lever-part 65 raises the pivot 64 which it carries and consequently raises the lever-part 62 as a whole, rotating said lever-part 62 bodily about the fulcrum 67. The relationship between the lever-parts 62 and 65 during the vibratory movements communicated by the link 81 is controlled by the eccentric disk 73. Said eccentric disk does not participate in the vibratory movement, being held by the arm 77 so that the fork 63 will slide over the periphery of said disk while it remains motionless. This is true whether at the beginning of the vibratory movement the platen is in lower case position and the disk is in the position shown in Fig. 4, or whether the platen is in shifted position and the disk is in the position shown in Fig. 6.

The invention while it may be used with a uniform ribbon is especially adapted for use with a ribbon divided longitudinally into fields or stripes of different characteristics. The ribbon 48 is a ribbon of this character, being provided with two longitudinal fields or stripes $a$ and $b$. These fields may differ in any desired way; for example, the field $a$ may be of one color such as black and the field *b* of another and different color such as red.

The throw of the ribbon carrier is controlled so as to write lengthwise of either field *a* or *b* at pleasure by positioning the stud 80 and link 81 at different predetermined points lengthwise of the slot 65, so that while the downward movement of the link 81 is always substantially the same, still, owing to the fact that its distance from the fulcrum 67 of the operating lever is altered, said link may communicate different extents of movement to the operating lever and ribbon carrier. The means for controlling the position of the stud 80 and the link 81 comprises a slide bar 84 which is provided with a longitudinal slot 85 (Fig. 2), said slot receiving a headed screw 86 which is supported on the bracket 69, said screw serving to support and guide the inner or right-hand end of the slide bar 84. Said slide bar is provided with a downward extension 87 formed with a vertical slot 88 which receives a lug or boss 80ᵃ integral with and extending forward from the stud 80 (Fig. 3). The outer or left-hand end of the slide bar 84 is pivotally connected at 89 with the upwardly extending arm of a bell crank lever 90, said lever being pivoted at 91 to an angular bracket 92 secured by headed screws 93 to the segment 15. The horizontally disposed arm of the bell crank 90 is pivotally connected to the upper end of a downwardly extending link 94, said link at its lower end being pivotally connected at 95 to one arm of a bell-crank lever 96. Said lever 96 is provided with an elongated hub 97 (Fig. 2) which receives a pivot screw 98, the latter entering the side of the base 1. The other arm of the lever 96 is connected to a forwardly extending link 99 which is adapted to be moved longitudinally back and forth by key-operated devices presently to be described.

It will be understood that when the link 99 is moved longitudinally back and forth it will operate through the train of mechanism last above described to slide the slide bar 84 longitudinally inward and outward and move the stud 80 and link 81 lengthwise of the slot 66. When the stud 80 is at the end of the slot farthest from the fulcrum 67, as shown in Fig. 4, it will operate to raise the ribbon carrier so as to present the upper ribbon field *a* opposite the printing point. The stud 80 is maintained at the rear of the slot 66 by the slotted extension 87 of the slide bar, the slot 88 in said extension permitting unobstructed movement of the stud when the link 81 is pulled down. The relationship between the stud 80 and the operating lever is maintained by the slotted extension 87 during successive vibratory movements of the operating lever, and the throw communicated to the ribbon carrier will be a constant one, so that the types will follow a straight path longitudinal of the ribbon field *a*.

The printing position of the operating lever is illustrated in Fig. 5. In this figure the lower dotted line *m* indicates the position of the operating lever at the beginning of the vibratory movement corresponding to the position shown in Fig. 4.

It will be understood that Figs. 4 and 5 show the parts when they are in lower case position.

Fig. 8 shows the relation between the printing point on the platen and the printing portion of the ribbon when the operating lever has been vibrated to the position shown in Fig. 5. From a consideration of Fig. 8 it will be seen that the upper ribbon field *a* is opposite the printing point *p*. If the platen be shifted while the stud 80 is at the rear of the slot 66, the operating lever and associate parts will be brought into the relationship shown in Fig. 6. If now a printing key be operated the link 81 will operate to raise the operating lever and ribbon carrier until the printing portion of the ribbon is brought to the position shown in Fig. 11, from which it will be noted that the ribbon field *a* is brought opposite the printing point in its shifted position. If the slide bar 84 be moved inward toward the middle of the machine to bring the stud 80 and link 81 to the dotted-line position shown in Fig. 4 and thereafter a printing key be actuated, the operating lever will be raised from the position shown in Fig. 4 (which corresponds to the *m*-line position of Fig. 5) to the position indicated by the dotted line *n* in Fig. 5, the ribbon carrier will be correspondingly lifted and the lower field *b* of the ribbon will be presented to the printing point as shown in Fig. 9. During such vibratory movements the throw of the carrier will be constant as long as the stud 80 is maintained in its new operative position by the slide bar 84, and consequently the types will follow a straight path longitudinal of the field *b*. If the platen be shifted while the stud 80 and link 81 are in the dotted line position of Fig. 4, then the printing relation between the ribbon and the printing point on the platen will be that illustrated in Fig. 12.

From what has been said it will be understood that in both positions of the platen the types are adapted to follow one of two parallel paths as illustrated in Fig. 22, wherein said paths are indicated by the dotted lines marked *f* and *g*. The path *f* extends longitudinally and centrally of the upper field *a* and will be followed by the types in either of the shift positions of the platen when the link 81 is maintained at the outer end of the slot 66, as illustrated in Fig. 2. The path *g* extends longitudinally and centrally of the lower ribbon field b and will be followed by the types in both shift positions of the platen, when the link 81 is maintained at the inner end of the slot 66 as shown by dotted lines in Fig. 4.

Novel key operated means for varying the normal position of the stud 80 and link 81 along the slot 66 are provided. Said means are illustrated in Figs. 1 and 13 to 20 inclusive and comprise a slidable plate 100 which is pivotally connected to the forward end of the link 99. The slidable plate 100 is mounted in a supporting frame or case which is detachably secured to the base of the machine. The case is composed of three parts which are shown detached or separated in Figs. 15, 16 and 17, being numbered 101, 102 and 103. The part 101 is the main portion of the case, the part 102 being in the nature of a guide plate and serving also as a washer or separator, and the part 103 being a cover. The main part 101 is provided with dowels or pins 104 to support the plate 102, the latter being provided with holes 105 for the reception of the dowels 104. At its lower end the main part 101 is provided with lugs 106 which coöperate with extensions 107 on the cover 103. The guide plate 102 is arranged between the cover and the main part of the case and the three parts are provided with holes 108 for the reception of screws 108$^a$ which secure the three parts together, the holes 108 in the main part 101 being tapped. As will be understood from an inspection of Fig. 14, a slide-way is provided between the part 101 and the cover 103, the top of the slide-way being the bottom wall of the guide plate, which wall has inclined faces 102$^a$ and 102$^b$ meeting at a point about the middle of the plate and the bottom of the slide-way being provided by the tops of the lugs 106. It is in this slide-way that the slidable plate 100 is seated and is adapted to be moved or slid longitudinally fore and aft of the machine by devices comprising a key stem or key bar 109 provided at its top with a key button 110 and adapted to be reciprocated up and down transversely of the plate 100 in a slot way 111 in the main part 101. This slot way is provided with an opening 112 which receives a grooved pin or stud 113 secured to the key stem 109. One end of a coiled restoring spring 114 is hooked around the stud 113, the other end of said spring being secured to a screw 115 which enters a tapped hole 116$^a$ in the part 101. The key bar or key stem 109, it will be noted, is in the form of a thin plate which has a vertical up and down movement in the slot 111. Said key bar or key stem may be pressed down by the key 110 until a limiting pin 116, carried by said key stem strikes the top of the part 101. When the key 110 is released after such depression, the key stem will be restored to normal position by the spring 114. The depressible spring-pressed key bar or stem has a single normal position and always moves up and down in the same path and to the same extent. The bar or stem 109 carries a headed stud or rivet 117 which serves as a pivot for an actuating arm 118, said arm normally hanging vertically down and carrying at its lower end a pin or stud 119 which normally stands above and out of engagement with cam surfaces or edges 120 and 121 formed at the top of the slide plate 100. Said edges meet at a point below the stud 119 and thence incline downward away from each other, terminating in recesses 120$^a$ and 121$^a$ which are normally at opposite sides of the arm 118 and stud 119 but are adapted alternately to receive the stud 119 at successive depressions of the key 110. The stud 119 is adapted to slide along the cam edges 120 and 121 and engage the recesses 120$^a$ and 121$^a$ to reciprocate the slide plate 100, and the arm 118 has an oscillatory movement on the pivot 117. To provide for this oscillatory movement the part 101 is chambered out or depressed as indicated at 122. The lower end of the stem 109 carries a lateral pin 123 which coöperates with a tapered or beveled downward extension 124 on the slide plate 100 to move said slide plate, and is also adapted to engage in recesses 125 and 126 formed at the sides of said tapered extension in the under side of the slide plate 100 to maintain said slide plate set in predetermined positions.

Before proceeding to explain the operation of the parts above described, the construction of novel indicating devices which are preferably associated with said parts will be described. Said indicating devices comprise an arm 127 which is secured by a screw 128 to the slide plate 100. The arm extends upward outside the case and is bent laterally and horizontally at its upper portion as indicated at 127$^a$. The horizontal extension or plate 127$^a$ underlies an opening 129 formed in the usual comb plate 130 which is secured by screws 130$^a$ to the cross bar 1$^a$ of the base 1. The opening or peep-hole 129 may be covered by a sheet 131 of mica or the like held in place by a slotted guard frame 132 secured by screws 133 to the comb-plate 130 (Figs. 13 and 14). The top of the horizontal plate 127$^a$ may be and preferably is colored to correspond with the lower ribbon field providing an indicating plate or color plate. In the present instance the top of the plate 127$^a$ will therefore be red in color. Fixed to the under side of the comb plate 130 by a screw 134 is another indicating or color plate 135, said plate underlying the peep-hole 129 and being set so that the movable plate 127$^a$ may move back and forth over said plate 135, which, of course, is stationary (Fig. 14). The top face of the indicating plate 135 may be colored black to correspond to the upper ribbon field a.

Prior to assembling the members 101, 102 and 103 composing the case, the parts which said case carries are, of course, arranged therein. After the case has been assembled it is secured to the left-hand side of the base 1 by headed screws 136. Said screws carry separating sleeves 137 which maintain the case at a fixed distance from the inner face of the left-hand side of the base 1 (Fig. 14). When the case is in place, the key 110 is at the upper left-hand corner of the main key board.

Referring to the operation of the key-bar mechanism, if it be assumed that the actuating stud 80 is at the operating point in the slot 66 farthest from the fulcrum in the operating lever, the parts of the key-bar mechanism will be related as shown in Fig. 13. If it be desired to change the operative ribbon field from black to red, the key 110 is depressed until the stud 116 contacts with the top of the case. As the key is depressed the key-bar 109 will be moved bodily downward and the stud 119 carried on the arm 118 will be brought into engagement with the inclined edge 120 on the slide plate 100 and will slide down said inclined edge until it becomes seated in the recess 120$^a$. During this movement of the stud 119 along the edge 120, the arm 118 will, of course, turn forward on its pivot 117. The slide plate 100 will remain motionless until the stud 119 is seated in the recess 120$^a$; but, thereafter, as the downward movement of the key stem 109 continues, the slide plate 100 will be slid forward in the case until it reaches the position shown in Fig. 19, in which figure the key stem 109 is shown at the limit of its downward movement. The forward movement of the slide plate 100 carries the toe of the beveled extension 124 thereon to the left of the path of the pin 123, so that when the key 110 is released and the spring 114 operates to restore the key stem and connected parts to normal position, the pin 123 will engage with the rear inclined face of the extension 124 and will cam said extension and the plate 100 of which it is a part, forward to the position shown in Fig. 20. At the end of the upward movement of the key stem the pin 123 thereon will be seated in the recess 126, thereby holding the slidable plate 100 in set position. During the upward or return movement of the key-bar the stud 119 will engage with the face 102$^a$ of the guide plate 102 and will be guided by said face back to normal position at the junction of faces 102$^a$ and 102$^b$, at which time the arm 118 will be vertical. Studs 138 on the slide plate may be provided to coöperate with the front and rear walls of the depression 122 in the part 101 to prevent accidental withdrawal of the slide plate 100 and to prevent overthrow thereof by a violent depression of the key 110.

It will be noted that the forward movement of the slide plate just described takes place in two stages. The first part of the movement is caused by the depression of the key 110 and the second part of the movement is caused by the spring 114, acting through the pin 123 on the extension 124. One advantage of breaking the movement up into two parts is that when the key bar 109 is nearing its downward limit the proportion of key-bar movement communicated to the stud 119 will be less than at the beginning of the key depression. To avoid an excessive extent of key-depression, the pin 123 and the beveled extension 124 are brought into play to finish the forward sliding movement of the plate 100 during the return movement of the key 110.

It will be understood that as the plate 100 is slid forward under the operation of the key 110, said plate pulls the link 99 forward, turns the bell crank 96 on its pivot, raising the link 94 and rocking the bell crank 90, which in turn moves the slide bar 84 inward until the stud 80 is in its operative position nearest the fulcrum of the operating lever.

Referring to the operation of the indicating devices during the cycle of key operations illustrated in Figs. 18, 19 and 20, it will be noted that in Fig. 18 the black indicating plate 135 is exposed to view beneath the peep hole 129, indicating that the black field a of the ribbon is operative. When the key 110 is depressed and the slidable plate 100 is moved forward, the arm 127 and plate 127$^a$ will be carried forward by said slidable plate so that the color plate 127$^a$ covers the stationary color plate 135. As shown in Fig. 19 the forward edge of the plate 127$^a$ is about at the forward edge of the peep hole 129. When the key 110 is restored to normal position as in Fig. 20 a slight additional forward movement of the color plate 127$^a$ will take place and said plate will occupy the position shown in Fig. 20, completely covering or hiding the black color plate 135 and showing only a red surface to the operator's view.

When it is desired to again make use of the black field a of the ribbon the operator again depresses the key 110, moving down the key-bar 109 and the arm 118 and causing the stud 119 on said arm to engage and slide down along the inclined edge 121, which edge, as will be seen in Fig. 20 is at this time beneath the stud 119, this being due to the fact that the parts are so proportioned that the junction of edges 120 and 121 has been moved forward past the stud 119 by the last operation of the key 110. As soon as the stud 119 is seated in the recess 121$^a$ the motion of the key-bar 109 will begin to be transmitted to the slidable plate 100 and the latter will move rearward in the case, forcing the link 99 rearward and operating the parts connected with said link 99, up to and including the actuating stud 80 and link 81. When the key 110 reaches the limit of its downward movement as shown in Fig. 21, the slidable plate 100 will have been moved rearward to the position shown in said figure and the nose of the extension 124 will have been carried to the rear of the pin 123. When, therefore, the key 110 is released, and the key bar 109 and connected parts are restored to normal position by the spring 114, the pin 123 during its upward movement will co-act with the forward beveled edge of the extension 124 to move the slide plate 100 still farther rearward, from the position shown in Fig. 21 to that shown in Fig. 18. At the end of the return movement of the key stem the pin 123 will be seated in the recess 125, thus holding the plate 110 in a new position. The movement of the slidable plate 100 from the position shown in Fig. 20 back to that shown in Fig. 18 operates through the connections and the slide bar 84 to restore the actuating stud 80 to the position in the slot 66 shown in Fig. 2, so that if now any of the printing keys be operated the black field $a$ of the ribbon will be presented to the types. During the return movement of the key-bar or key stem 109 the stud 119 will be guided back to normal position by the guide face $102^b$ of the guide plate 102.

Referring to the operation of the indicating devices during the cycle of key operations illustrated in Figs. 20, 21 and 18 it will be noted that during the depression of the key 110 the red indicating plate $127^a$ will be moved from the position shown in Fig. 20 to that shown in Fig. 21 and will partially uncover the fixed black plate 135. When the key 110 is released and permitted to return from the position shown in Fig. 21 to that shown in Fig. 18, the red plate $127^a$ will complete its rearward movement and will entirely uncover the black plate 135 so that the red plate will disappear from view and the black plate only will be seen by the operator, indicating that the black ribbon field is operative.

It will be noted that in my present invention I combine a vibratory ribbon carrier with a two-part operating lever and means including an eccentric for holding the two parts of said lever in one or another of a plurality of normal relations; that the axis of rotation of the eccentric is coincident with the axis of rotation of said operating lever; that said eccentric is supported independently of said operating lever but is on the same fulcrum-screw or member; that the main part of the operating lever is in itself a lever having a fixed fulcrum; that the other part of said operating lever is pivoted to the shorter arm of the main part and is formed with a forked or bifurcated portion which provides a strap; that the other and longer arm of said main part is formed with a longitudinally-extending slot; that the eccentric coöperates with said strap; that the eccentric is part of an eccentric device which further includes a lever or adjusting member and a hub; that connections are provided between the eccentric and the platen shifting devices, said connections comprising an arm fixed to a shiftable bar which is part of the platen shifting devices, said arm being pivotally connected with said adjusting member; and that means are provided for varying the vibratory movement of said operating lever, said last recited means including an actuating link carrying a stud engaging said slot and hand-controlled means for moving said link and setting said stud at predetermined points along said slot.

Heretofore one inking field or color has been rendered ineffective and another inking field or color simultaneously rendered effective, usually in two ways:—first, by the use of a switch lever, and secondly, by means of two separate keys. When the switch lever has been used it has been operated sidewise from one position to another, the switch lever remaining in one or the other of these two positions as long as the inking field or color remains unchanged. When the two keys have been used, one key is utilized for one inking field or color and the other key for another inking field or color. In the case of the switch lever, it occupies normally one of two positions and the operator must in consequence reach to one or the other of two different points or places to make the change in the ribbon. The same thing is equally true in the case where two separate keys or buttons are used, whereas in my construction there is but one key and that occupies always the same place. The hand of the operator can without trouble and almost intuitively reach the key quickly and unerringly so as to make the change in the ribbon in the quickest possible time. The key is a downwardly operating key like the character keys of the keyboard and hence is more convenient for the operator than a sidewise switch lever which necessitates a different kind of movement of the hand of the operator. This single key returns automatically to normal position when relieved of its downward pressure and hence for each change of inking field or color the key has the same downward movement as well as from the same point or position.

Between the key and the ribbon is a transmitting train of devices in which is a reciprocating part or slidable plate that is acted upon by the key and in such way that one down-stroke of the key moves the reciprocating part forwardly or in one direction and the next downward movement of the same key moves the reciprocating part rearwardly or in the opposite direction. It will also be noted that I combine a ribbon-carrier and actuating means therefor with varying means for varying said actuating means to change the operative field of the ribbon, which varying means is independent of the traveling carriage of the machine and includes a single ribbon-changing key; that said ribbon-changing key operates independently of the carriage; that said key communicates its motion to the devices for changing ribbon-fields; that said key is a slidably mounted key having a single normal position; that said key is depressible at one operation to render one ribbon field operative and at the next succeeding operation to render another ribbon field operative; that said key is movable or depressible from a single normal position and operates at alternate depressions to render the same ribbon field operative and at depressions intermediate said alternate depressions to render another ribbon field operative; that said key is movable from normal position to render one ribbon field operative and is also movable to the same extent from the same normal position in the same direction to render another ribbon field operative; that said varying means for the actuating means includes a movable part and a key operative to move said movable part alternately in opposite directions, said key being itself always movable in the same path in the same direction from a single normal position and being adapted to set said movable member in one or another of a plurality of normal positions; that said movable member in the present instance is a slidable plate and is operative by a key-controlled device or key bar, the key hereinbefore referred to being on said key bar or device; that said slidable plate is provided with oppositely inclined edges; that the key bar carries an arm pivoted thereon and operative on said inclined edges through a stud secured to said arm; that said stud is adapted to engage alternately the inclined edges of said slidable plate; that said key bar is also provided with a pin which is adapted to engage with one or another of a plurality of recesses in said slidable plate to maintain said plate set in one or another of a plurality of predetermined normal positions; that said arm is a pivoted key-controlled arm; that the inclined edges on said slidable plate are means for changing the direction of movement of said arm whereby the direction of movement of said plate is changed; that fixed guiding surfaces, coöperative with said arm to restore it to an unvarying normal position, are provided, said fixed surfaces in the present instance being in the case within which said arm is arranged; that said arm is automatically movable on its pivot from side to side of said key bar; that said slidable plate is slidable in a slide way in said case in a direction transverse of said key bar; that a spring is provided for maintaining said key bar in its normal position, said spring in the present instance being secured at one end to said case; that said case is detachably secured to the frame of the machine so that the key on the key bar is at the upper left-hand corner of the regular keyboard of the machine. It will furthermore be noted that the ribbon carrier, the means for actuating said carrier and the varying means for changing the actuating means to change the operative field of the ribbon, are combined with indicating devices comprising a movable indicating plate secured to the slidable plate forming part of said varying means. said indicating devices also including a fixed indicating plate; that the movable indicating plate is adapted to cover and uncover the fixed indicating plate at successive key operations of a single key, the movements of said movable plate being in opposite directions; that said indicating plates in the present instance are color-plates, one being movable to cover and uncover the fixed color plate by key-controlled means; that in the present instance said key-controlled means comprise a single spring-pressed key having the same normal position when the fixed color-plate is covered and when said fixed color plate is uncovered; and that said color-plates may also be denominated indicating surfaces, there being provided herein a fixed indicating surface and a movable indicating surface, the movable indicating surface being in the nature of a cover or covering means for the other indicating surface and being controlled by a single spring-pressed key which automatically returns always to the same normal position.

Various changes may be made without departing from my invention.

What I claim as new and desire to secure by Letters Patent, is:—

1. In a typewriting machine, the combination of a vibratory ribbon carrier, a two-part operating lever, means including an eccentric for holding the two parts of said lever in one or another of a plurality of normal relations and means for actuating said operating lever at printing operation.

2. In a typewriting machine, the combination of a vibratory ribbon carrier; a two-part operating lever; means for holding the two parts of said lever in one or another of a plurality of normal relations, said means including an eccentric device having an axis of rotation coincident with the axis of rotation of said operating lever; and means for actuating said operating lever at printing operation.

3. In a typewriting machine, the combination of a vibratory ribbon carrier, a two-part operating lever, means including an eccentric supported independently of said operating lever for holding the two parts of said lever in one or another of a plurality of normal relations, and means for actuating said operating lever at printing operation.

4. In a typewriting machine, the combination of a vibratory ribbon carrier; a two-part operating lever, one of the parts of said lever being provided with a strap; means including an eccentric coöperative with said strap for holding the two parts of said operating lever in one or another of a plurality of normal relations; and means for actuating said lever at printing operation.

5. In a typewriting machine, the combination of a vibratory ribbon carrier; a two-part operating lever, one of the lever parts being pivoted on the other; means including an eccentric mounted independently of said operating lever for holding the two lever parts in one or another of a plurality of normal relations; and means for actuating said operating lever at printing operation.

6. In a typewriting machine, the combination of a vibratory ribbon carrier; a two-part operating lever, one of the lever parts being pivoted on the other and being provided with a forked arm; means including an eccentric coöperative with said forked arm for varying the normal relation between the two parts of said operating lever; and means for actuating said lever at printing operation.

7. In a typewriting machine, the combination of a vibratory ribbon carrier; a two-part operating lever, one of the lever parts being pivoted on the other and being provided with a forked arm; means including an eccentric coöperative with said forked arm for varying the normal relation between the two parts of said operating lever, said eccentric being pivotally mounted independently of said operating lever; and means for actuating said lever at printing operation.

8. In a typewriting machine, the combination of a vibratory ribbon carrier; a two-part operating lever, the main lever part having a fixed fulcrum and the other lever part being pivoted on said main lever part and provided with a strap; means for varying the relation between the two lever parts, said means including an eccentric coöperative with said strap; and means for actuating said operating lever at printing operation.

9. In a typewriting machine, the combination of a vibratory ribbon carrier; a two-part operating lever, the main lever part having a fixed fulcrum and pivotally supporting the other lever part, said other lever part being provided at one side of its pivot with a strap and being connected at the opposite side of its pivot to the ribbon carrier; an eccentric coöperative with said strap; means for actuating said eccentric to vary the normal relation between the two lever parts of the operating lever; and means for actuating said operating lever at printing operation.

10. In a typewriting machine, the combination of a vibratory ribbon carrier; an operating lever; a fulcrum therefor, said operating lever being composed of two parts, the main part of said operating lever being provided with a hub coöperating with said fulcrum, the other part of said operating lever being pivoted to said main part and being provided with a strap; an eccentric device coöperative with said strap for varying the normal relation between the two parts of said operating lever, said eccentric device comprising an eccentric disk, a lever and a hub portion, all secured together; and means for actuating said operating lever at printing operation.

11. In a typewriting machine, the combination of a vibratory ribbon carrier; a two-part operating lever, the main part of said operating lever having a fixed fulcrum, the other part of said operating lever being pivoted to the shorter arm of the main part and provided with a strap, the other and longer arm of the main part being provided with a longitudinally extending slot; means including an eccentric coöperative with said strap for varying the normal relationship between the two parts of said operating lever; and means for varying the vibratory movement of said operating lever.

12. In a typewriting machine, the combination of a vibratory ribbon carrier; a two-part operating lever, the main part of said operating lever having a fixed fulcrum, the other part of said operating lever being pivoted to the shorter arm of the main part and provided with a strap, the other and longer arm of the main part being provided with a longitudinally extending slot; means including an eccentric coöperative with said strap for varying the normal relationship between the two parts of said operating lever; and means for varying the vibratory movement of said operating lever including an actuating stud adapted to be set at predetermined points along said slot.

13. In a typewriting machine, the combination of a vibratory ribbon carrier; a two-part operating lever, the main part of said operating lever having a fixed fulcrum, the other part of said operating lever being pivoted to the shorter arm of the main part and provided with a strap, the other and longer arm of the main part being provided with a longitudinally extending slot; means including an eccentric coöperative with said strap for varying the normal relationship between the two parts of said operating lever; and means for varying the vibratory movement of said operating lever including a link carrying a stud engaging said slot and hand-controlled means for moving said link and setting said stud at predetermined points along said slot.

14. In a typewriting machine, the combination of a vibratory ribbon carrier, a two-part operating lever, the main part of said operating lever having a fixed fulcrum, the other part of said operating lever being pivoted to the shorter arm of the main part and provided with a strap, the other and longer arm of the main part being provided with a longitudinally extending slot; means including an eccentric coöperative with said strap for varying the normal relationship between the two parts of said operating lever; a key operated universal bar; and means for varying the vibratory movement of said operating lever including a link connected to said universal bar and provided with a stud engaging said slot and hand controlled means for moving said link and setting said stud at predetermined points along said slot.

15. In a typewriting machine, the combination of a platen; platen shifting devices; a vibratory ribbon carrier; a two-part operating lever; an eccentric for varying the normal relationship between the two parts of said operating lever; connections between said eccentric and said platen shifting devices; and means for actuating said operating lever at printing operation.

16. In a typewriting machine, the combination of a platen; platen shifting devices; a vibratory ribbon carrier; a two-part operating lever; means for holding the two parts of said lever in one or another of a plurality of normal relations, said means including an eccentric device having an axis of rotation coincident with the axis of rotation of said operating lever, connections between said eccentric device and said platen shifting devices; and means for actuating said operating lever at printing operation.

17. In a typewriting machine, the combination of a platen; platen shifting devices; a vibratory ribbon carrier; a two-part operating lever; means including an eccentric supported independently of said operating lever for holding the two parts of said lever in one or another of a plurality of normal relations, said means being connected to said platen shifting devices; and means for actuating said operating lever at printing operation.

18. In a typewriting machine, the combination of a platen; platen shifting devices; a vibratory ribbon carrier; a two-part operating lever, one of the lever parts being pivoted on the other and being provided with a strap; means including an eccentric coöperative with said strap for varying the normal relationship between the two parts of said operating lever, said means being connected with said platen shifting devices; and means for actuating said operating lever at printing operation.

19. In a typewriting machine, the combination of a platen; platen shifting devices; a vibratory ribbon carrier; a two-part operating lever, the main lever part having a fixed fulcrum and pivotally supporting the other lever part, said other lever part being provided at one side of its pivot with a strap and being connected at the opposite side of its pivot to the ribbon carrier; an eccentric disk coöperative with said strap; connections between said eccentric and said platen shifting devices; and means for actuating said operating lever at printing operation.

20. In a typewriting machine, the combination of a platen; platen shifting devices; a vibratory ribbon carrier; a two-part operating lever, the main lever part having a fixed fulcrum and pivotally supporting the other lever part, said other lever part being provided at one side of its pivot with a strap and being connected at the opposite side of its pivot to the ribbon carrier; an eccentric disk coöperative with said strap; connections between said eccentric and said platen shifting devices, said connections including a lever on which said eccentric disk is fixed and an arm pivotally connected with said lever and rigidly connected with said platen shifting devices; and means for actuating said operating lever at printing operation.

21. In a typewriting machine, the combination of a platen; platen shifting devices including a shiftable bar; a two-part operating lever, the main part of said operating lever having a fixed fulcrum, the other part of said operating lever being pivoted to the shorter arm of the main part and provided with a strap; an eccentric device coöperative with said strap, said eccentric device comprising an eccentric disk, an adjustable lever and a hub portion all secured together; an arm fixed to said shiftable bar and pivotally connected to said adjustable lever; and means for actuating said operating lever at printing operation.

22. In a typewriting machine, the combination of a platen; platen shifting devices; a vibratory ribbon carrier; a two-part operating lever, the main part of said operating lever having a fixed fulcrum, the other part of said operating lever being pivoted to one arm of the main part and being provided with a strap, the other arm of the main part being provided with a longitudinally extending slot; an eccentric coöperative with said strap; connections between said eccentric and said platen shifting devices; and means for varying the vibratory movement of said operating lever.

23. In a typewriting machine, the combination of a platen; platen shifting devices; a vibratory ribbon carrier; a two-part operating lever, the main part of said operating lever having a fixed fulcrum, the other part of said operating lever being pivoted to one arm of the main part and being provided with a strap, the other arm of the main part being provided with a longitudinally extending slot; an eccentric coöperative with said strap; connections between said eccentric and said platen shifting devices; and means for varying the vibratory movement of said operating lever, said last recited means including a link carrying a stud engaging said slot and hand-controlled means for moving said link and setting said stud at predetermined points along said slot.

24. In a typewriting machine, the combination of a vibratory ribbon carrier; means for actuating said carrier at printing operation; and means for varying the actuating means to change the operative field of the ribbon, said last named means including a slidable plate and a key-controlled device for moving said plate alternately in opposite directions and for setting it in predetermined positions, said device being movable always in the same direction from a single normal position.

25. In a typewriting machine, the combination of a vibratory ribbon carrier; means for actuating said carrier at printing operation; and means for varying the actuating means to change the operative field of the ribbon, said last named means including a slidable plate and a key bar movable transversely of said plate and operative on said plate to move it in opposite directions by successive key operations.

26. In a typewriting machine, the combination of a vibratory ribbon carrier; means for actuating said carrier at printing operation; and means for varying the actuating means to change the operative field of the ribbon, said last named means including a slidable plate provided with oppositely inclined edges, a key bar movable transversely of said plate and an arm pivoted to said key bar and operative on the inclined edges of said plate.

27. In a typewriting machine, the combination of a vibratory ribbon carrier; means for actuating said carrier at printing operation; and means for varying the actuating means to change the operative field of the ribbon, said last named means including a slidable plate provided with oppositely inclined edges, a key bar movable transversely of said plate and an arm pivoted to said key bar and provided with a stud adapted to engage alternately the inclined edges of said slidable plate.

28. In a typewriting machine, the combination of a vibratory ribbon carrier; means for actuating said carrier at printing operation; and means for varying the actuating means to change the operative field of the ribbon, said last named means including a slidable plate provided with oppositely inclined edges, a key bar movable transversely of said plate and an arm pivoted to said key bar and operative on the inclined edges of said plate, said key bar being also provided with a pin which is adapted to engage with one or another of a plurality of recesses in said slidable plate to maintain said plate set in one or another of a plurality of predetermined normal positions.

29. In a typewriting machine, the combination of a vibratory ribbon carrier; means for actuating said carrier at printing operation; and means for varying the actuating means to change the operative field of the ribbon, said last named means including a slidable plate, a pivoted key-controlled arm operative to move said plate, and means on said plate for changing the direction of movement of said arm whereby the direction of movement of said plate is changed.

30. In a typewriting machine, the combination of a vibratory ribbon carrier; means for actuating said carrier at printing operation; and means for varying the actuating means to change the operative field of the ribbon, said last named means including a slidable plate, a pivoted key-controlled arm operative to move said plate, and means on said plate for changing the direction of movement of said arm whereby the direction of movement of said plate is changed, and fixed guiding surfaces coöperative with said arm to restore it to an unvarying normal position.

31. In a typewriting machine, the combination of a vibratory ribbon carrier; means for actuating said carrier at printing operation; and means for varying the actuating means to change the operative field of the ribbon, said last named means including a slidable plate, a spring-pressed key-bar movable in a direction transverse of said plate and provided with a pivoted arm automatically movable from side to side on its pivot and operative to move said plate in opposite directions during successive actuations of said key bar, and means on said key bar coöperative with said plate to maintain it set in either of the positions to which it may be moved by said pivoted arm.

32. In a typewriting machine, the combination of a vibratory ribbon carrier; means for actuating said carrier at printing operation; and means for varying the actuating means to change the operative field of the ribbon, said last named means including a case, a plate slidable in said case, a key-bar slidable in said case transversely of said plate, a spring for maintaining said key-bar in a single normal position, an arm pivoted on said key bar and provided with a stud engageable with depressions in said plate to move it in opposite directions and a pin on said key-bar engageable with said plate to maintain it in set position.

33. In a typewriting machine, the combination of a vibratory ribbon carrier; an operating lever provided with a longitudinal slot; means for actuating said lever at printing operation including a link provided with an actuating stud engaging said slot; and means for altering the normal position of said link and setting said actuating stud at different predetermined positions along said slot, said last named means including a slidable plate, a pivoted key-controlled arm operative to move said plate and means on said plate for changing the direction of movement of said arm whereby the direction of movement of said plate is changed.

34. In a typewriting machine, the combination of a vibratory ribbon carrier; an operating lever provided with a longitudinal slot; means for actuating said lever at printing operation including a link provided with an actuating stud engaging said slot; and means for altering the normal position of said link and setting said actuating stud at different predetermined positions along said slot, said last named means including a slide bar engaging said actuating stud, a slidable plate, connections between said slide bar and said slidable plate and means for actuating said slidable plate in opposite directions at successive operations, said last named means including a pivoted key-controlled arm engageable with depressions in said plate at opposite sides of the pivot of said arm.

35. In a typewriting machine, the combination of a vibratory ribbon carrier; an operating lever provided with a longitudinal slot; means for actuating said lever at printing operation including a link provided with an actuating stud engaging said slot; and means for altering the normal position of said link and setting said actuating stud at different predetermined positions along said slot, said last named means including a slide bar engaging said actuating stud, a slidable plate, connections between said slide bar and said slidable plate and means for actuating said slidable plate in opposite directions at successive operations, said last named means including a key bar movable transversely of said slide plate and pivotally supporting an arm engageable with said slidable plate to actuate the same, said key bar being also provided with means for maintaining said plate set in predetermined positions.

36. In a typewriting machine, the combination of a ribbon carrier; means for actuating said carrier; means for varying the actuating means to change the operative field of the ribbon, said last named means including a slidable plate; and indicating devices comprising a movable indicating plate secured to said slidable plate and also including a fixed indicating plate.

37. In a typewriting machine, the combination of a ribbon carrier; means for actuating said carrier; means for varying the actuating means to change the operative field of the ribbon, said last named means including a key-operated slidable plate; and indicating devices including a movable indicating plate on said slidable plate and also including a relatively fixed indicating plate, said movable plate being adapted to cover and uncover said relatively fixed plate at successive key operations.

38. In a typewriting machine, the combination of a ribbon carrier; means for actuating said carrier; means for varying the actuating means to change the operative field of the ribbon; and indicating devices comprising a key-operated indicating plate and a relatively fixed indicating plate, said first named indicating plate being movable in opposite directions to cover and uncover said fixed plate by successive actuations of a single key from an unvarying normal position.

39. In a typewriting machine, the combination of a ribbon carrier; means for actuating said carrier; means for varying the actuating means to change the operative field of the ribbon; and indicating devices comprising a fixed color-plate, a movable color-plate and key-controlled means for moving said movable color-plate to cover and uncover said fixed color-plate.

40. In a typewriting machine, the combination of a ribbon carrier; means for actuating said carrier; means for varying the actuating means to change the operative field of the ribbon; and indicating devices comprising a fixed color-plate, a movable color-plate and means for moving said movable color-plate to cover and uncover said fixed color-plate, said last recited means comprising a single spring-pressed key having the same normal position when the fixed color plate is covered and when it is uncovered.

41. In a typewriting machine, the combination with ribbon mechanism provided with means for changing from one inking field to another, of indicating devices comprising a fixed indicating surface, a movable indicating surface and means for moving said movable indicating surface to cover and uncover said fixed indicating surface, said last recited means comprising a single spring-pressed key having the same normal position when the fixed indicating surface is covered and when it is uncovered.

42. In a typewriting machine, the combination with ribbon mechanism provided with means for changing from one inking field to another, of indicating devices comprising a fixed indicating surface, a movable indicating surface and means for moving said movable indicating surface to cover and uncover said fixed indicating surface, said last recited means comprising a single key which after each operation automatically returns to the same invariable position regardless of whether the fixed indicating surface is covered or uncovered.

43. In a typewriting machine, the combination with ribbon mechanism provided with means for changing from one inking field to another, of indicating devices comprising a fixed indicating surface, a movable indicating surface and means for moving said movable indicating surface to cover and uncover said fixed indicating surface, said last recited means comprising a single automatically restored key having the same operation for covering and uncovering said fixed indicating surface.

44. In a typewriting machine, the combination with ribbon mechanism provided with means for changing from one inking field to another, of indicating devices comprising an indicating surface, a covering means, and means for moving said covering means to cover and uncover said indicating surface, said last recited means comprising a single spring-pressed key having the same normal position when the indicating surface is covered and when it is uncovered.

45. In a typewriting machine, the combination with ribbon mechanism provided with means for changing from one inking field to another, of indicating devices comprising an indicating surface, a covering means, and means for moving said covering means to cover and uncover said indicating surface, said last recited means comprising a single key which after each operation automatically returns to the same invariable position regardless of whether the indicating surface is covered or uncovered.

46. In a typewriting machine, the combination with ribbon mechanism provided with means for changing from one inking field to another, of indicating devices comprising a movable indicating surface, and means for moving said indicating surface into and out of a position where it will be visible, said last recited means comprising a single key which after each operation automatically returns to the same position regardless of whether the indicating surface is visible or invisible.

47. In a typewriting machine, the combination with ribbon mechanism provided with means for changing from one inking field to another, of indicating devices comprising an indicating surface arranged behind a plate provided with a peep hole and means for moving said surface into and out of register with said peep hole, said last recited means comprising a single key which after each operation automatically returns to the same position regardless of whether the indicating surface is visible through said peep hole or is covered by said plate.

Signed at the borough of Manhattan, city of New York, in the county of New York and State of New York, this 9th day of June, A. D. 1908.

CLIO B. YAW.

Witnesses:
    CHARLES E. SMITH,
    E. M. WELLS.